(12) United States Patent
Chiang et al.

(10) Patent No.: US 8,817,488 B2
(45) Date of Patent: Aug. 26, 2014

(54) PORTABLE ELECTRONIC DEVICE HAVING A DETACHABLE BATTERY MODULE

(75) Inventors: Chin-Wei Chiang, New Taipei (TW); Chia-Cheng Su, New Taipei (TW); Tsung-Hsien Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 211 days.

(21) Appl. No.: 13/423,290

(22) Filed: Mar. 19, 2012

(65) Prior Publication Data
US 2012/0320554 A1    Dec. 20, 2012

(30) Foreign Application Priority Data

Jun. 15, 2011    (TW) .............................. 100120911 A

(51) Int. Cl.
*H05K 7/02*    (2006.01)
*H05K 7/04*    (2006.01)
*G06F 1/16*    (2006.01)
*H01M 2/10*    (2006.01)

(52) U.S. Cl.
CPC .............. *G06F 1/1635* (2013.01); *Y02E 60/12* (2013.01); *G06F 1/1626* (2013.01); *H01M 2/1022* (2013.01)
USPC ............................ 361/807; 361/801; 439/374

(58) Field of Classification Search
USPC ............. 361/679.03, 679.43, 679.56, 679.57, 361/725, 731, 798, 801–802, 807, 809, 361/810; 439/374, 377
See application file for complete search history.

(56) References Cited

U.S. PATENT DOCUMENTS

| | | | |
|---|---|---|---|
| 5,182,699 A * | 1/1993 | Kobayashi et al. ....... | 361/679.41 |
| 5,251,105 A * | 10/1993 | Kobayashi et al. ....... | 361/679.58 |
| 5,506,749 A * | 4/1996 | Matsuda ................... | 361/679.58 |
| 6,639,790 B2 * | 10/2003 | Tsai et al. ................ | 361/679.27 |
| 7,236,356 B2 * | 6/2007 | Ulla et al. ................ | 361/679.21 |
| 2003/0228790 A1 | 12/2003 | Ito | |
| 2008/0182164 A1* | 7/2008 | Lu et al. ........................ | 429/100 |

FOREIGN PATENT DOCUMENTS

| TW | 486113 | 5/2002 |
|---|---|---|
| TW | M265673 | 5/2005 |
| TW | M265805 | 5/2005 |

OTHER PUBLICATIONS

Office action mailed on Mar. 25, 2014 for the Taiwan application No. 100120911, filing date: Jun. 15, 2011, p. 2 line 4~26, p. 3-14 and p. 15 line 1~13.

* cited by examiner

*Primary Examiner* — Hung S Bui
(74) *Attorney, Agent, or Firm* — Winston Hsu; Scott Margo

(57) ABSTRACT

A portable electronic device includes a main body and a first battery module. The main body includes a base, two first engaging portions respectively disposed on two ends of a side of the base, a casing installed on the base, and a first connecting terminal set disposed on a surface of the casing adjacent to the side of the base and electrically connected to an electronic component. The first battery module includes a first housing whereon a plurality of holes is formed, two first constraining portions for engaging with the corresponding first engaging portions respectively, and a first transmission terminal set for contacting the first connecting terminal set. The portable electronic device further includes a first latch structure. The first latch structure includes a plurality of first hooks for engaging inside the plurality of first holes on the first housing.

20 Claims, 6 Drawing Sheets

PORTABLE ELECTRONIC DEVICE HAVING A DETACHABLE BATTERY MODULE

BACKGROUND OF THE INVENTION

1. Field of the Invention

The present invention relates to a portable electronic device, and more particularly, to a portable electronic device having a detachable battery module.

2. Description of the Prior Art

With the advanced technology, a portable electronic device becomes a popular product gradually. An important reason for the purchase is design of a battery of the portable electronic device, such as functions of long supply capacity and an easy detachable mechanism. One of the conventional portable electronic devices does not include the detachable battery, so that a battery charger can be utilized as low battery. The other conventional portable electronic device includes the detachable mechanism for the battery, and a plurality of batteries in full power can be prepared for replacement as the used battery is exhausted, so as to increase operating period of the portable electronic device. Therefore, design of a detachable mechanism for the battery with simple assembly and waterproof/dustproof function is an important issue of the portable electronic product industry.

SUMMARY OF THE INVENTION

The present invention provides a portable electronic device having a detachable battery module for solving above drawbacks.

According to the claimed invention, a portable electronic device includes a main body and a first battery module detachably disposed on a side of the main body for transmitting electric power to the main body. The main body includes a base, two first engaging portions respectively disposed on two edges of a side of the base, a casing installed on the base for accommodating an electronic component, and a first connecting terminal disposed on a surface of the casing adjacent to the side of the base and electrically connected to the electronic component. The first battery module includes a first housing whereon at least one first hole is formed, two first constraining portions disposed on the first housing for respectively engaging with the corresponding first engaging portion so as to prevent the first housing from moving relative to the base at a first axial direction and a second axial direction different from the first axial direction, and a first transmission terminal disposed on a surface of the first housing for contacting the first connecting terminal. The portable electronic device further includes a first latch structure slidably disposed on a side of the casing adjacent to the first connecting terminal. The first latch structure includes at least one first hook for engaging with the at least one first hole on the first housing, so as to prevent the first battery module from moving relative to the casing at a third axial direction different from the first axial direction and the second axial direction.

According to the claimed invention, the first axial direction, the second axial direction and the third axial direction are substantially perpendicular to each other.

According to the claimed invention, the portable electronic device further includes a first resilient component disposed between the first latch structure and the casing of the main body for generating resilient deformation when the first latch structure slides relative to the casing along a first direction.

According to the claimed invention, the main body further comprises at least one first contacting portion disposed on the base for contacting against the first latch structure.

According to the claimed invention, the first battery module further includes a first waterproofing spacer disposed around the first transmission terminal.

According to the claimed invention, the first battery module further includes at least one first inclined structure for guiding the at least one first hook of the first latch structure to engage with the corresponding at least one first hole.

According to the claimed invention, the portable electronic device further includes a first bolt disposed on the first latch structure and resiliently piercing through an opening on the casing for contacting against the casing, so as to prevent the first latch structure from moving relative to the casing.

According to the claimed invention, the main body further comprises a plurality of first baffles disposed on the casing, and the first battery module further comprises a plurality of first blocks for contacting against the plurality of first baffles, so as to prevent the first battery module from moving relative to the casing at the second axial direction.

According to the claimed invention, the main body further comprises a plurality of first baffles disposed on the side of the base, and the first battery module further comprises a plurality of first blocks for contacting against the plurality of first baffles, so as to prevent the first battery module from moving relative to the base at the second axial direction.

According to the claimed invention, the main body further comprises a first surface and a second surface, the first engaging portion is disposed on the first surface, the first connecting terminal is disposed on the second surface, and the first surface is substantially perpendicular to the second surface.

According to the claimed invention, the first battery module further comprises at least one first cushioning portion, and the main body further comprises at least one second cushioning portion.

According to the claimed invention, the main body of the portable electronic device further includes two second engaging portions respectively disposed on two edges of the other side of the base, and a second connecting terminal disposed on a surface of the casing adjacent to the other side of the base and electrically connected to the electronic component. The portable electronic device further includes a second latch structure slidably disposed on a side of the casing adjacent to the second connecting terminal, and the second latch structure comprising at least one second hook.

According to the claimed invention, the two engaging portions are respectively for engaging with the corresponding first constraining portion of the first battery module, and the at least one second hook is for engaging with the at least one first hole on the first battery module, so that the first transmission terminal of the first battery module is electrically connected to the second transmission terminal.

According to the claimed invention, the portable electronic device further includes a second battery module detachably disposed on the other side of the main body for transmitting electric power to the main body. The second battery module includes a second housing whereon at least one second hole is formed, two second constraining portions disposed on the second housing for respectively engaging with the corresponding second engaging portion, so as to prevent the second housing from moving relative to the base at the first axial direction and the second axial direction, and a second transmission terminal disposed on a surface of the second housing for contacting the second connecting terminal. The at least one second hook of the second latch structure is engaged with the at least one second hole on the second housing, so as to prevent the second battery module from moving relative to the casing at the third axial direction.

The present invention utilizes the latch structure to prevent the battery module from moving relative to the main body at Y-axis, utilizes the engaging portion to prevent the battery module from moving relative to the main body at X-axis and Z-axis, and utilizes the baffles to prevent the battery module from moving relative to the main body at Z-axis, so that the battery module can be installed on the main body stably by triaxial immobilization. In addition, the portable electronic device of the present invention can include two battery modules (the first battery module and the second battery module) with identical structures and functions, and two identical structures (such as the engaging portion, the baffle, the connecting terminal, the latch structure and the contacting portion) are disposed on two sides of the main body, so the battery module can be installed on the sides of the main body alternatively, or the two battery modules can be installed on two sides of the main body simultaneously, for increasing operating period of the portable electronic device. An outer structure of the battery module can be designed as a handle conforming to ergonomics. When the battery modules are respectively installed on two sides of the main body, a user can hold two battery modules by hands for easy operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
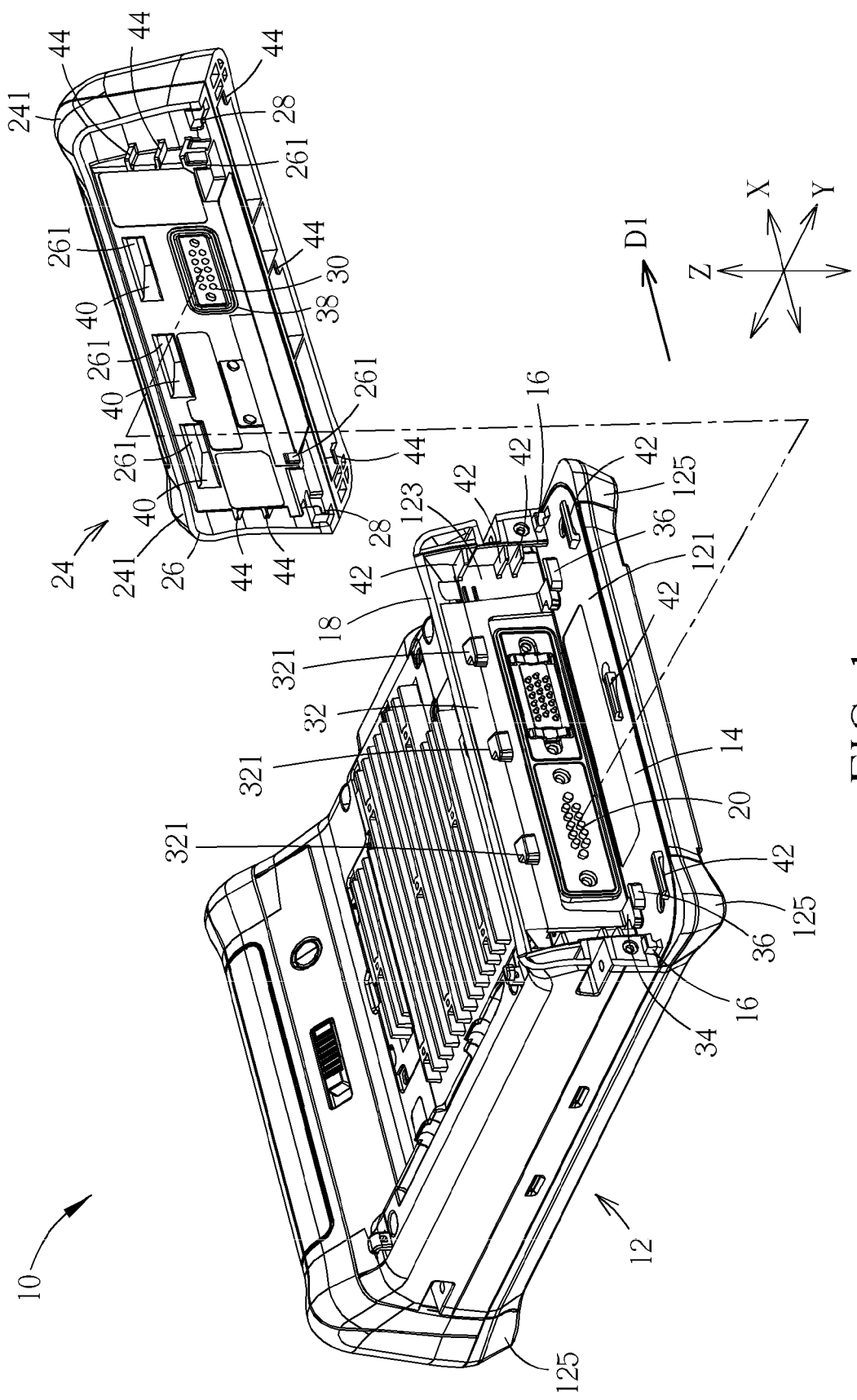
FIG. 1 and FIG. 2 are diagrams of a portable electronic device in different views according to an embodiment of the present invention.
Figure 2:
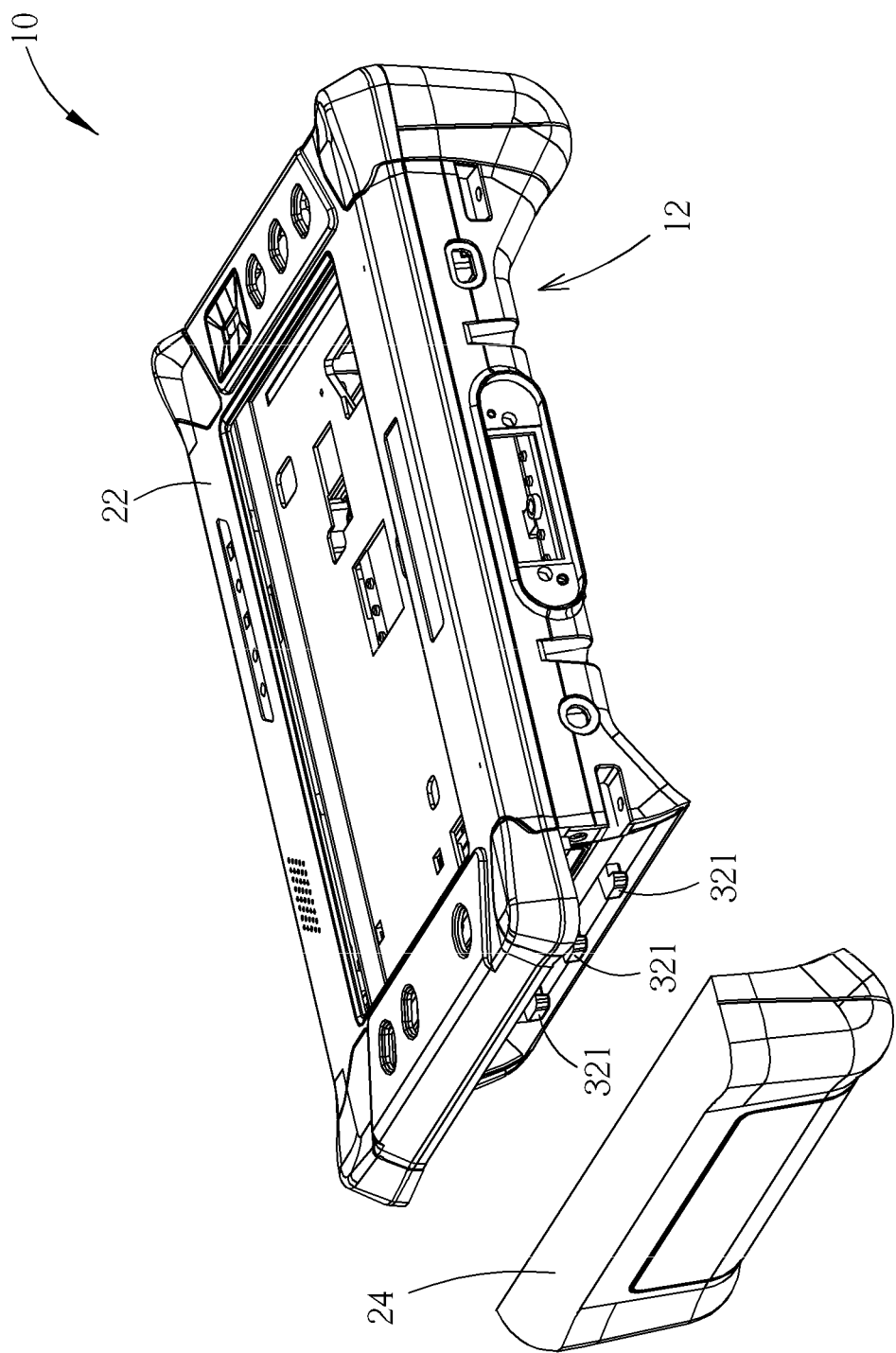
Figure 3:
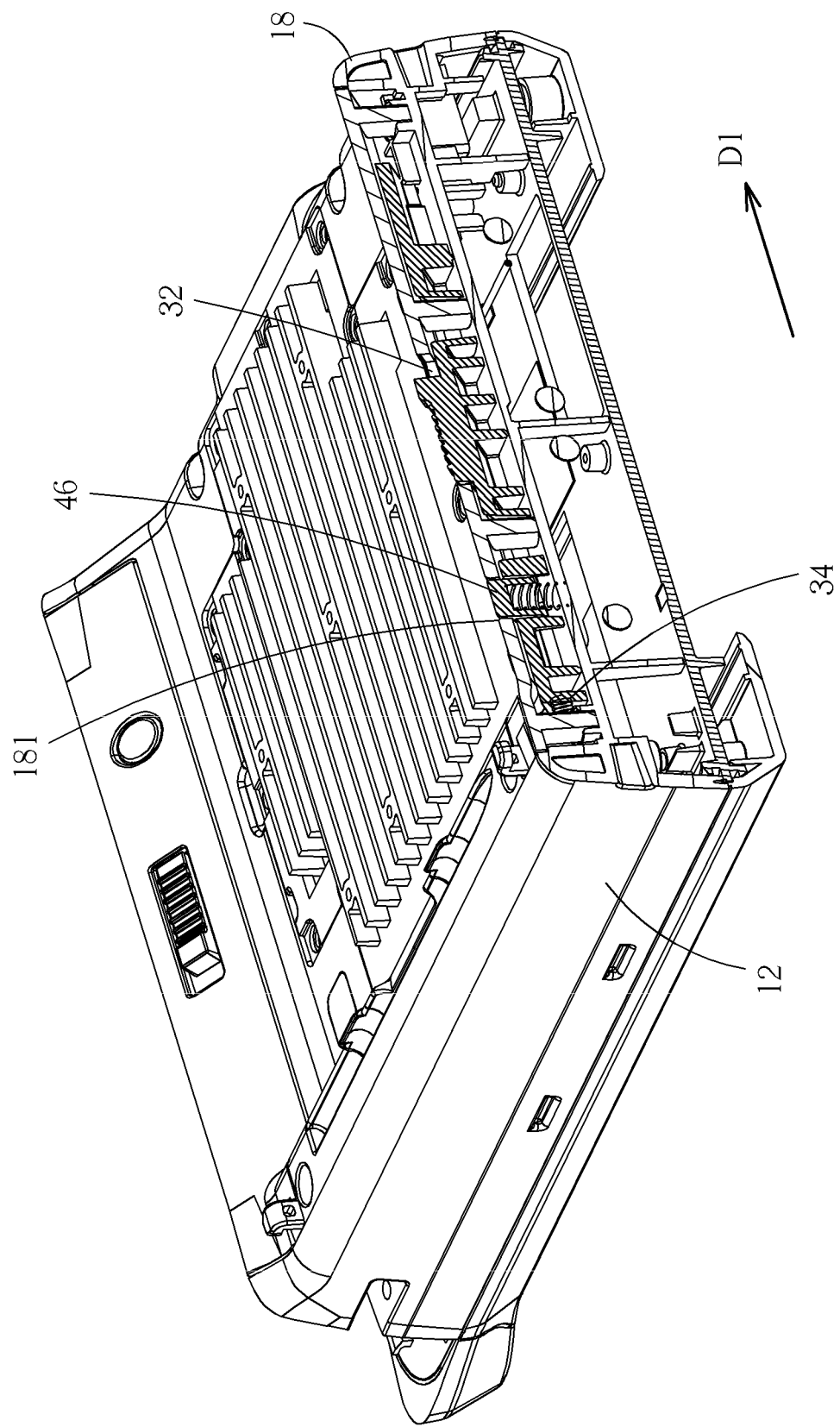
FIG. 3 and FIG. 4 are sectional views of the portable electronic device in different modes according to the embodiment of the present invention.
Figure 4:
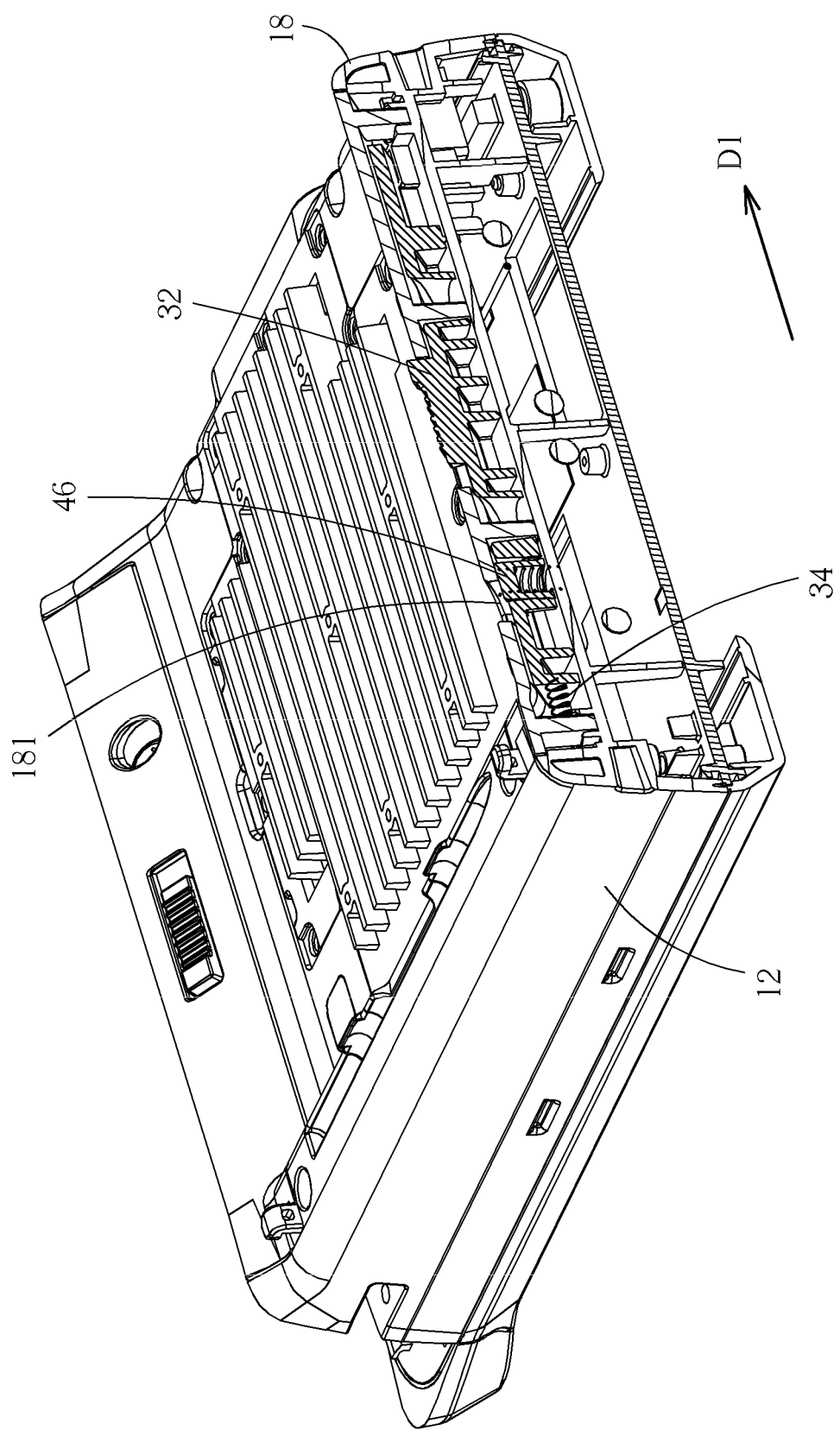
Figure 5:
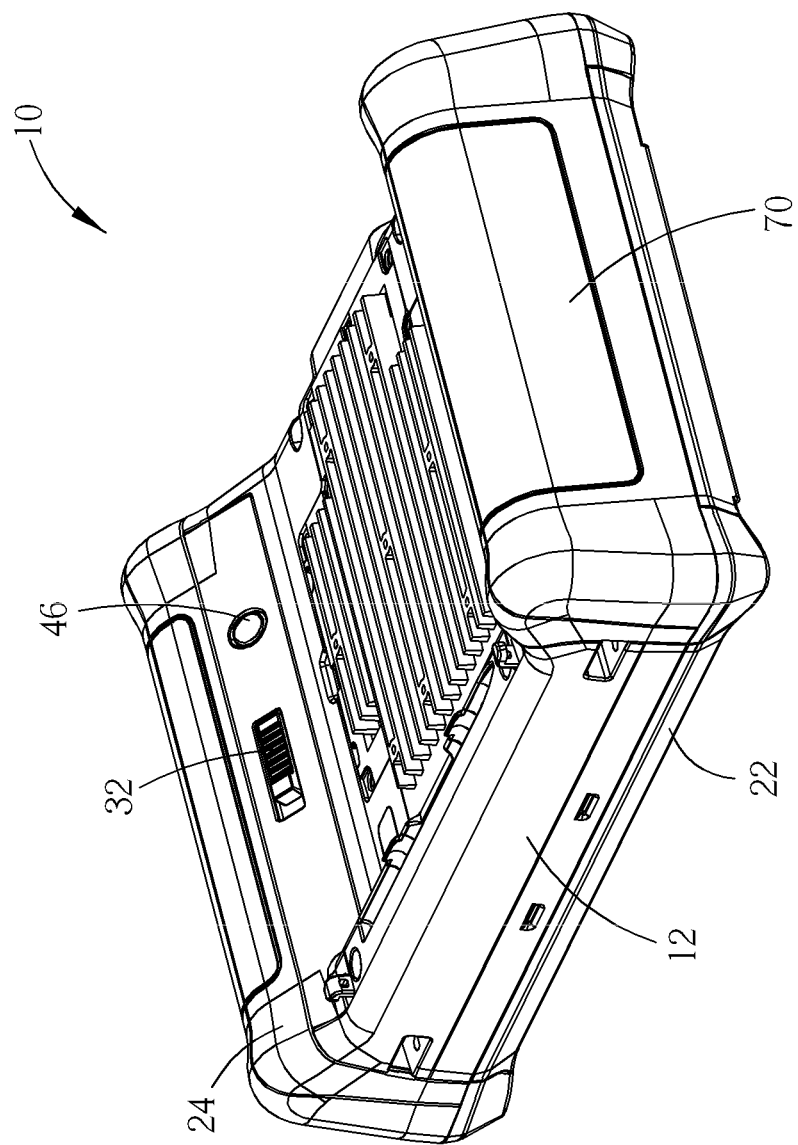
FIG. 5 is an assembly diagram of the portable electronic device according to the embodiment of the present invention.

Please refer to FIG. 1 to FIG. 5. FIG. 1 and FIG. 2 are diagrams of a portable electronic device 10 in different views according to an embodiment of the present invention. FIG. 3 and FIG. 4 are sectional views of the portable electronic device 10 in different modes according to the embodiment of the present invention. FIG. 5 is an assembly diagram of the portable electronic device 10 according to the embodiment of the present invention. The portable electronic device 10 can be a notebook computer, a tablet computer and so on. The portable electronic device 10 includes a main body 12. The main body 12 includes a first surface 121 and a second surface 123 whereon several components are disposed, and the first surface 121 is substantially perpendicular to the second surface 123. The main body 12 further includes a base 14, two first engaging portions 16, a casing 18 and a first connecting terminal 20. The first engaging portions 16 are respectively disposed on the first surface 121 and located at two edges of a side of the base 14. The casing 18 is disposed on the side of the base 14 for accommodating electronic components, such as a processor, a hard disc, a main board and so on. A panel module 22 is disposed on a surface of the base 14 for receiving signals generated from the electronic components and displaying the information. The first connecting terminal 20 is disposed on the second surface 123 and located at the side of the casing 18 adjacent to the base 14 for electrically connecting to the electronic components.

The portable electronic device 10 further includes a first battery module 24 detachable disposed on the side of the main body 12 for transmitting electric power to the panel module 22 via the main body 12. The first battery module 24 is integrated with the main body 12 by closing to the first surface 121 and the second surface 123. The first battery module 24 can include two first cushioning portions 241, and the main body 12 can further include four second cushioning portions 125 protruding from four corners of the base 14. The first cushioning portions 241 and the second cushioning portions 125 are for absorbing vibration generated from the portable electronic device 10 as being attacked after the first battery module 24 is installed on the main body 12, so as to prevent the electronic components from damage. The first battery module 24 can include a first housing 26 whereon a plurality of first holes 261 is formed, and the first cushioning portion 241 can be a protrusion formed on the first housing 26. The first battery module 24 further includes two first constraining portions 28 disposed on the first housing 26. When the first battery module 24 is installed on the main body 12, the two first constraining portions 28 are respectively for engaging with the corresponding first engaging portion 16, so as to prevent the first housing 26 from moving relative to the base 14 at a first axial direction (X-axis) and a second axial direction (Z-axis) different from the first axial direction. The first battery module 24 further includes a first transmission terminal 30 disposed on a surface of the first housing 26 for contacting the first connecting terminal 20 when the first battery module 24 is installed on the main body 12.

The portable electronic device 10 further includes a first latch structure 32 slidably disposed on the side of the casing 18 adjacent to the first connecting terminal 20 for fixing the first battery module 24 on the main body 12. The first latch structure 32 includes a plurality of first hooks 321 for respectively engaging with the plurality of first holes 261 on the first housing 26, so as to prevent the first battery module 24 from moving relative to the casing 18 at a third axial direction (Y-axis) different from the first axial direction and the second axial direction. Therefore, the first battery module 24 can be fixed on the main body 12 with constraint of three axial directions (such X-axis, Y-axis and Z-axis) by the first latch structure 32 and the first engaging portions 16. In addition, as shown in FIG. 3, the portable electronic device 10 can further include a first resilient component 34 disposed between the first latch structure 32 and the casing 18 of the main body 12. Resilient deformation of the first resilient component 34 can be generated for storing resilient recovering force when the first latch structure 32 slides relative to the casing 18 along a first direction D1. The resilient recovering force can be released after the first latch structure 32 is unlocked, so as to slide the first latch structure 32 to an initial position along a direction opposite to the first direction D1. For preventing the first latch structure 32 from departing from the casing 18 by the first battery module 24, the main body 12 can further include at least one first contacting portion 36 disposed on the base 14 for contacting against the first latch structure 32 (or the first hook 321). Structural stability of the first latch structure 32 and the casing 18 is increased by increasing an amount of the first contacting portion 36, which means that the first latch structure 32 is not damaged by a weight of the first battery module 24 with a plurality of first contacting portions 36.

Furthermore, the first battery module 24 can further include a first waterproofing spacer 38 disposed around the first transmission terminal 30. When the first battery module 24 is installed on the main body 12, the first waterproofing spacer 38 can be for preventing liquid from leaking into the conductive components (which are between the first connecting terminal 20 and the first transmission terminal 30). The first battery module 24 can further include a plurality of first inclined structures 40. Each first inclined structure 40 can be for guiding the first hook 321 of the first latch structure 32 to engage with the corresponding first hole 261, so as to increase assembly convenience of the portable electronic device 10. For increasing structural stability of the first battery module 24 and the main body 12, the main body 12 can further include a plurality of first baffles 42 respectively formed on the casing 18 (or disposed on the side of the base 14), and the first battery module 24 can further include a plurality of first blocks 44. When the first battery module 24 is installed on the main body 12, the plurality of first blocks 44 can respectively contact against the plurality of first baffles 42, so as to prevent the first battery module 24 form moving relative to the casing 18 and the base 14 at the second axial direction (Z-axis).

Besides, the portable electronic device 10 of the present invention can further include a first bolt 46 disposed on the first latch structure 32 and resiliently piercing through an opening 181 on the casing 18. As shown in FIG. 3, the first bolt 46 can contact against the casing 18 for preventing the first latch structure 32 from sliding relative to the casing 18, so that the present invention can utilize an assembly of the first bolt 46 and the first latch structure 32 to prevent the first battery module 24 from being away from the main body 12. On the other hand, as shown in FIG. 4, the first latch structure 32 can be pushed for disassembling the first battery module 24 from the main body 12 after the first bolt 46 is pressed and inserted into the opening 181.

Figure 6:
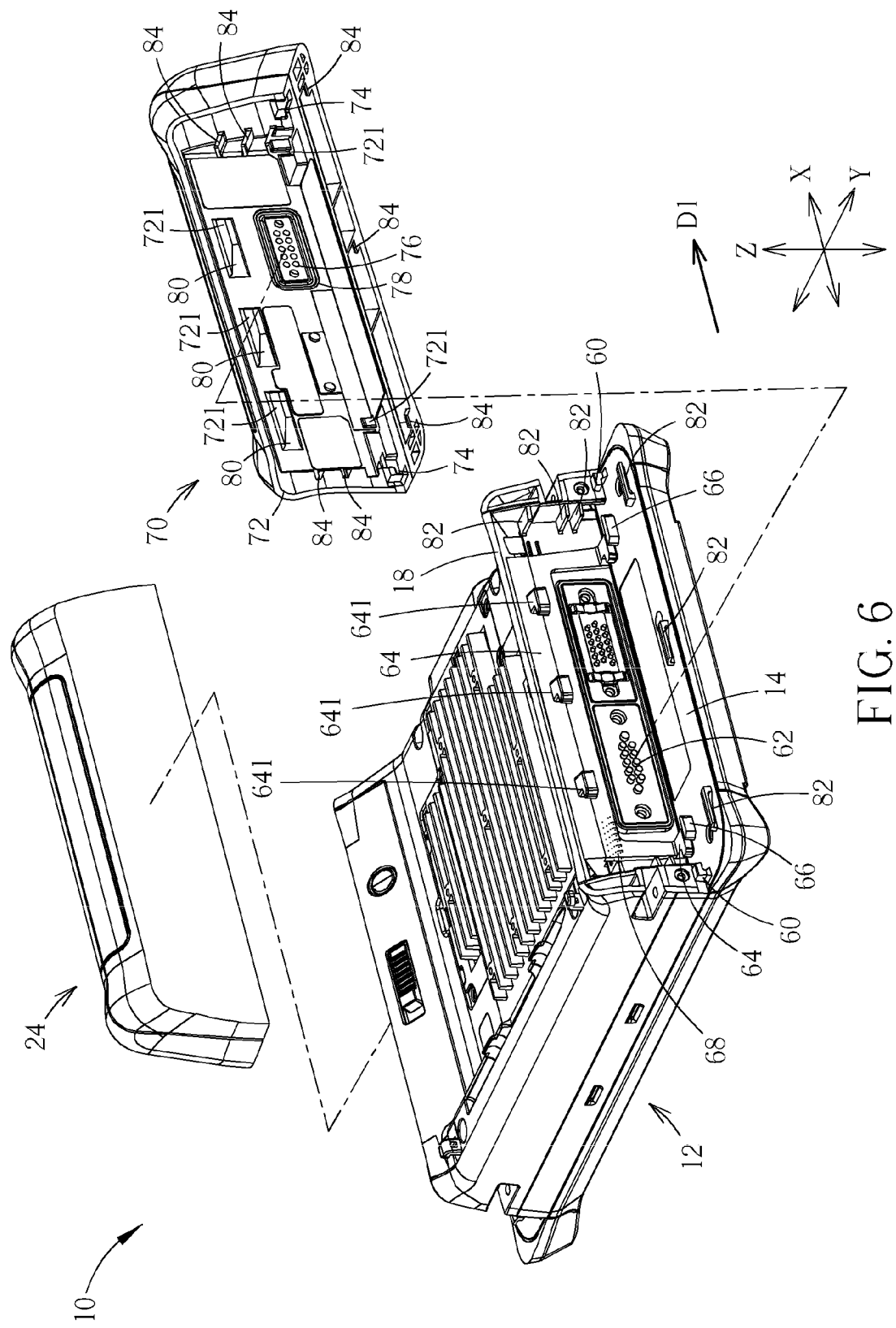
FIG. 6 is a diagram of the portable electronic device in another view according to the embodiment of the present invention.

Please refer to FIG. 1 and FIG. 6. FIG. 6 is a diagram of the portable electronic device 10 in another view according to the embodiment of the present invention. The portable electronic device 10 of the prevent invention can be a symmetric structure, so the main body 12 of the portable electronic device 10 can further include two second engaging portions 60 respectively disposed on two edges of the other side of the base 14, and a second connecting terminal 62 disposed on a surface of the casing 18 adjacent to the other side of the base 14 for electrically connecting to the electronic components, which is the same as the first connecting terminal 20. The portable electronic device 10 can further include a second latch structure 64 slidably disposed on a side of the casing 18 adjacent to the second connecting terminal 62. The second latch structure 64 can include a plurality of second hooks 641. Because the portable electronic device 10 has symmetric structures and functions on two edges, the first battery module 24 can be installed on a right side or on a left side of the main body 12 selectively (the first battery module 24 can be fixed on the first engaging portion 16 or the second engaging portion 60 alternatively), which means the two second engaging portions 60 of the main body 12 can be respectively for engaging with the corresponding first constraining portion 28 of the first battery module 24, and the plurality of second hooks 641 can be respectively for engaging inside the plurality of first holes 261 on the first battery module 24, so that the first battery module 24 can be fixed on the edge of the main body 12 stably with the constraint at X-axis, Y-axis and X-axis. Meanwhile, the first transmission terminal 30 of the first battery module 24 can be electrically connected to the second connecting terminal 62 of the portable electronic device 10 for transmitting signals.

In addition, the main body 12 of the portable electronic device 10 can further include at least one second contacting portion 66 disposed on the base 14 and contacting against the second latch structure 64 for preventing the second latch structure 64 from being away from the casing 18 by external force, such as the weight of the first battery module 24. The portable electronic device 10 can further include a second resilient component 68 disposed between the second latch structure 64 and the casing 18 of the main body 12 for generating resilient deformation when the second latch structure 64 slides relative to the casing 18 along a direction opposite to the first direction D1. Function of the second resilient component 68 is the same as the first resilient component 34, and detailed description is omitted herein for simplicity.

It should be mentioned that the portable electronic device 10 of the present invention can further include a second battery module 70 detachably disposed on the other side of the main body 12, which means the second battery module 70 and the first battery module 24 can be respectively installed on tow sides of the main body 12 for transmitting the electric power to the panel module 22 by turns. The second battery module 70 can include a second housing 72 whereon a plurality of second holes 721 is formed. When the second battery module 70 is installed on the other side of the main body 12, the plurality of second hooks 641 of the second latch structure 64 is for engaging with the corresponding second holes 721 on the second housing 72, so as to prevent the second battery module 70 from moving relative to the casing 18 at the third axial direction (Y-axis). The second battery module 70 can further include two second constraining portions 74 disposed on the second housing 72. As the first battery module 24 is installed on the side of the main body 12, the two second constraining portions 74 of the second battery module 70 can be respectively for engaging with the corresponding second engaging portion 60, so as to prevent the second housing 72 from moving relative to the base 14 at the first axial direction (X-axis) and the second axial direction (Z-axis), so the second battery module 70 can be installed on the other side of the main body 12 simultaneously. The second battery module 70 can further include a second transmission terminal 76 disposed on the surface of the second housing 72 for contacting the second connecting terminal 62 (or the first connecting terminal 20). Due to the symmetric structure of the main body 12, structures and functions of the second battery module 70 is the same as the ones of the first battery module 24, and the second battery module 70 can be installed on two sides of the main body 12 selectively.

The second battery module 70 can further include a second waterproofing spacer 78 disposed around the second transmission terminal 76 of the second battery module 70 for preventing the liquid from leaking into the conductive components (which are between the second transmission terminal 76, the second connecting terminal 62, and the first transmission terminal 30) when the second battery module 70 is installed on the main body 12. The second battery module 70 can further include a plurality of second inclined structure 80 for guiding the plurality of second hooks 641 of the second latch structure 64 (or the plurality of first hooks 321 of the first latch structure 32) to engage with the corresponding second holes 721, so as to increase the assembly convenience of the portable electronic device 10.

The main body 12 can further include a plurality of second baffles 82 formed on the casing 18 or disposed on the side of the base 14. The second battery module 70 can further include a plurality of blocks 84 for respectively contacting against the plurality of second baffles 82, so as to prevent the second battery module 70 from moving relative to the casing 18 and the base 14 at the second axial direction (Z-axis) for increasing structural stability of the second battery module 70 and the main body 12. The portable electric device 10 can further include a second bolt (not shown in figures) disposed on the second latch structure 64 and resiliently piercing through a corresponding opening on the casing 18 for contacting against the casing 18, so as to prevent the second latch structure 64 from moving relative to the casing 18. Motion of the second bolt is the same as the first bolt 46, and detailed description is omitted herein for simplicity.

Comparing to the prior art, the prevent invention utilizes the latch structure to prevent the battery module from moving relative to the main body at Y-axis, utilizes the engaging portion to prevent the battery module from moving relative to the main body at X-axis and Z-axis, and utilizes the baffles to prevent the battery module from moving relative to the main body at Z-axis, so that the battery module can be installed on the main body stably by triaxial immobilization. In addition, the portable electronic device of the present invention can include two battery modules (the first battery module and the second battery module) with identical structures and functions, and two identical structures (such as the engaging portion, the baffle, the connecting terminal, the latch structure and the contacting portion) are disposed on two sides of the main body, so the battery module can be installed on the sides of the main body alternatively, or the two battery modules can be installed on two sides of the main body simultaneously, for increasing operating period of the portable electronic device. An outer structure of the battery module can be designed as a handle conforming to ergonomics. When the battery modules are respectively installed on two sides of the main body, a user can hold two battery modules by hands for easy operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic device comprising:
   a main body comprising:
      a base;
      two first engaging portions respectively disposed on two end portions of a side of the base, wherein free ends of the two first engaging portions respectively point toward opposite directions;
      a casing installed on the base for accommodating an electronic component; and
      a first connecting terminal disposed on a surface of the casing adjacent to the side of the base and electrically connected to the electronic component;
   a first battery module detachably disposed on a side of the main body for transmitting electric power to the main body, the first battery module comprising:
      a first housing whereon at least one first hole is formed;
      two first constraining portions disposed on the first housing for respectively engaging with the corresponding two first engaging portions, so as to prevent the first housing from moving relative to the base at a first axial direction and a second axial direction different from the first axial direction; and
      a first transmission terminal disposed on a surface of the first housing for contacting the first connecting terminal; and
   a first latch structure slidably disposed on a side of the casing adjacent to the first connecting terminal, the first latch structure comprising:
      at least one first hook for engaging with the at least one first hole on the first housing, so as to prevent the first battery module from moving relative to the casing at a third axial direction different from the first axial direction and the second axial direction.

2. The portable electronic device of claim 1, wherein the first axial direction, the second axial direction and the third axial direction are substantially perpendicular to each other.

3. The portable electronic device of claim 1, further comprising:
   a first resilient component disposed between the first latch structure and the casing of the main body for generating resilient deformation when the first latch structure slides relative to the casing along the first direction.

4. The portable electronic device of claim 1, wherein the main body further comprises at least one first contacting portion disposed on the base for contacting against the first latch structure.

5. The portable electronic device of claim 1, wherein the first battery module further comprises:
   a first waterproofing spacer disposed around the first transmission terminal.

6. The portable electronic device of claim 1, wherein the first battery module further comprises:
   at least one first inclined structure for guiding the at least one first hook of the first latch structure to engage with the corresponding at least one first hole.

7. The portable electronic device of claim 1 further comprising:
   a first bolt disposed on the first latch structure and resiliently piercing through an opening on the casing for contacting against the casing, so as to prevent the first latch structure from moving relative to the casing.

8. The portable electronic device of claim 1, wherein the main body further comprises a plurality of first baffles disposed on the casing, and the first battery module further comprises a plurality of first blocks for contacting against the plurality of first baffles, so as to prevent the first battery module from moving relative to the casing at the second axial direction.

9. The portable electronic device of claim 1, wherein the main body further comprises a plurality of first baffles disposed on the side of the base, and the first battery module further comprises a plurality of first blocks for contacting against the plurality of first baffles, so as to prevent the first battery module from moving relative to the base at the second axial direction.

10. The portable electronic device of claim 9, wherein the main body further comprises a first surface and a second surface, each first engaging portion is disposed on the first surface, the first connecting terminal is disposed on the second surface, and the first surface is substantially perpendicular to the second surface.

11. The portable electronic device of claim 1, wherein the first battery module further comprises at least one first cushioning portion, and the main body further comprises at least one second cushioning portion.

12. The portable electronic device of claim 1, wherein the main body of the portable electronic device further comprises:
   two second engaging portions respectively disposed on two edges of the other side of the base; and
   a second connecting terminal disposed on a surface of the casing adjacent to the other side of the base and electrically connected to the electronic component;
   the portable electronic device further comprises:
   a second latch structure slidably disposed on a side of the casing adjacent to the second connecting terminal, and the second latch structure comprising at least one second hook.

13. The portable electronic device of claim 12, wherein the two second engaging portions are respectively for engaging with the corresponding two first constraining portions of the first battery module, and the at least one second hook is for engaging with the at least one first hole on the first battery module, so that the first transmission terminal of the first battery module is electrically connected to the second transmission terminal.

14. The portable electronic device of claim 12, wherein the portable electronic device further comprises:
   a second battery module detachably disposed on the other side of the main body for transmitting electric power to the main body, the second battery module comprising:
      a second housing whereon at least one second hole is formed;
      two second constraining portions disposed on the second housing for respectively engaging with the corresponding two second engaging portions, so as to prevent the second housing from moving relative to the base at the first axial direction and the second axial direction; and
      a second transmission terminal disposed on a surface of the second housing for contacting the second connecting terminal;
   wherein the at least one second hook of the second latch structure is engaged with the at least one second hole on the second housing, so as to prevent the second battery module from moving relative to the casing at the third axial direction.

15. The portable electronic device of claim 12, further comprising:
   a second resilient component disposed between the second latch structure and the casing of the main body for generating resilient deformation when the second latch structure slides relative to the casing along the direction opposite to the first direction.

16. The portable electronic device of claim 12, wherein the main body further comprises at least one second contacting portion disposed on the base for contacting against the second latch structure.

17. The portable electronic device of claim 14, wherein the second battery module further comprises:
   at least one second inclined structure for guiding the at least one second hook of the second latch structure to engage with the corresponding at least one second hole.

18. The portable electronic device of claim 12, further comprising:
   a second bolt disposed on the second latch structure and resiliently piercing through an opening on the casing for contacting against the casing, so as to prevent the second latch structure from moving relative to the casing.

19. The portable electronic device of claim 14, wherein the main body further comprises a plurality of second baffles disposed on the casing, and the second battery module further comprises a plurality of second blocks for contacting against the plurality of second baffles, so as to prevent the second battery module from moving relative to the casing at the second axial direction.

20. The portable electronic device of claim 14, wherein the main body further comprises a plurality of second baffles disposed on the side of the base, and the second battery module further comprises a plurality of second blocks for contacting against the plurality of second baffles, so as to prevent the second battery module from moving relative to the base at the second axial direction.

* * * * *